(12) United States Patent
Mulvey et al.

(10) Patent No.: US 7,491,002 B2
(45) Date of Patent: Feb. 17, 2009

(54) SPHERICAL ENCLOSURE FOR A CAMERA

(75) Inventors: Christopher Blair Mulvey, Woodland, GA (US); Russell Henry Mullins, Newnan, GA (US); William Rolfe Henry, Barnesville, GA (US)

(73) Assignee: Criterion Technology, Inc.GA (US)

( * ) Notice: Subject to any disclaimer, the term of this patent is extended or adjusted under 35 U.S.C. 154(b) by 224 days.

(21) Appl. No.: 11/088,736

(22) Filed: Mar. 25, 2005

(65) Prior Publication Data

US 2005/0259985 A1    Nov. 24, 2005

(51) Int. Cl.
*G03B 17/00* (2006.01)
*G03B 17/02* (2006.01)

(52) U.S. Cl. ..................... 396/427; 396/535

(58) Field of Classification Search ............... 396/427, 396/535, 12, 419; 348/143, 151, 373
See application file for complete search history.

(56) References Cited

U.S. PATENT DOCUMENTS

| | | | | | |
|---|---|---|---|---|---|
| 3,535,442 | A | * | 10/1970 | Jennings | .................... 348/151 |
| 3,720,147 | A | * | 3/1973 | Bemis | ........................ 396/427 |
| 4,080,629 | A | * | 3/1978 | Hammond et al. | .......... 348/373 |
| 4,736,218 | A | * | 4/1988 | Kutman | ....................... 396/427 |
| 4,945,367 | A | * | 7/1990 | Blackshear | .................. 396/427 |
| 5,418,567 | A | * | 5/1995 | Boers et al. | .................. 348/375 |
| 5,765,043 | A | * | 6/1998 | Tyler | ........................... 396/12 |
| 5,818,519 | A | * | 10/1998 | Wren | .......................... 348/151 |
| 6,262,768 | B1 | * | 7/2001 | Williams | .................. 348/217.1 |
| 6,354,749 | B1 | * | 3/2002 | Pfaffenberger, II | .......... 396/427 |
| 6,503,000 | B1 | * | 1/2003 | Kim | ........................... 396/427 |
| 6,715,940 | B2 | * | 4/2004 | Top et al. | .................... 396/427 |
| 2002/0197074 | A1 | * | 12/2002 | Gluck | ......................... 396/427 |
| 2004/0032492 | A1 | * | 2/2004 | Wada et al. | ................. 348/143 |
| 2004/0155959 | A1 | * | 8/2004 | Cullens | ..................... 348/144 |
| 2006/0024046 | A1 | * | 2/2006 | Jones et al. | ................. 396/427 |

\* cited by examiner

*Primary Examiner*—Rodney E Fuller
(74) *Attorney, Agent, or Firm*—Molins & Co.

(57) ABSTRACT

A spherical enclosure for a camera, has in some examples, an optically transmitting wall, a highly-reflective external surface, a coated internal surface, a collapsible internal lining, and a support tube. The wall may have a region of varying wall thickness providing a lens. The collapsible internal liner is made of a material that obscures the camera's silhouette, and is inserted through an opening in the wall while folded, and then expands into position. The inner surface of the enclosure may be coated with a material that reduces internal reflections. The camera, when mounted in the enclosure has the optical center of the camera coincident with the geometric center of the spherical enclosure, so that distortion of the camera image is minimized.

10 Claims, 7 Drawing Sheets

SPHERICAL ENCLOSURE FOR A CAMERA

FIELD OF THE INVENTION

This invention relates generally to surveillance camera enclosures and housings, and more specifically with a spherical lens enclosure that provides the benefits of hemispherical lens applications with additional viewing and covert capabilities.

DESCRIPTION OF RELATED ART

It is very common to use closed circuit television cameras for video surveillance. In many applications, it is necessary to mount the camera inside an enclosure to protect the device from weather, tampering, and provide an obscure means of pointing a camera without visible detection. In such situations, an optically clear lens enclosure is typically utilized to minimize video degradation.

The prior art discloses a hemispherical polymer lens enclosure. These devices employ fixed or motorized platforms that pan and tilt a camera, allowing the camera to be moved and aimed at various locations in the viewing area. These devices have a very limited tilt range and can view areas from directly in the center of the hemispherical enclosure to the perimeter of the enclosure. Also, in a hemispherical enclosure, the camera is mounted within the hemisphere, below what would be the spherical center. In this position, the enclosure provides a distorting surface to the view of the camera as the inner surface of a hemisphere is radially symmetric only from the center of the sphere.

Many applications in closed circuit television applications demand that an increase in tilt range be afforded to the user. The only previous solution has been to utilize motorized platforms without a hemispherical polymer lens enclosure.

BRIEF DESCRIPTION OF THE DRAWINGS

These and other features and advantages of the present invention will become apparent from consideration of the following specification when taken in conjunction with the accompanying drawings in which.

SUMMARY AND OBJECTS OF THE INVENTION

The present invention provides a generally spherical lens enclosure that is formed by bonding a plurality of optical sections. A minimal seam joining the optical sections may be located at any point on the sphere in relation to the mounting location. In making the seams at the juncture of the optical sections, the purpose is to maximize mechanical strength while minimizing the optical obstruction that may be induced by the seam.

Once the sphere has been formed, a molded liner can be inserted through a mounting hole to obscure the camera position. The mounting hole connects to a conduit that contains wiring for the internal components within the spherical lens enclosure.

It is therefore an object of the present invention to allow for the camera to be mounted in a spherical lens enclosure such that the optical center of the camera is coincident with the geometric center of the spherical enclosure throughout all angles of camera pan and tilt, minimizing distortion of the camera image. It is a further object of the present invention to provide a spherical camera enclosure that obscures the camera position. It is a further object to allow for an interior coating of the enclosure to further obscure the camera position. It is a further object to allow for the placement of lens-like areas of the enclosure by shaping the interior and/or exterior surface of the enclosure. It is a further object to provide an enclosure that can be manufactured by bonding two or more sections into a spherical enclosure, where the seam between the sections can be positioned to minimize its interference with viewing areas of interest and where the individual sections may be made utilizing dissimilar manufacturing techniques and/or materials.

It is a further object to provide for a range of motion of the camera within the spherical enclosure of more than ninety degrees of tilt angle in the vertical plane, and a full and continuous 360 degrees of panning angle in the horizontal plane.

It is a further object to provide an interior liner for the spherical enclosure that cloaks the position of the camera and can be inserted through an opening in the enclosure and then expanded once inserted.

DESCRIPTION OF THE PREFERRED EMBODIMENTS

Figure 1:
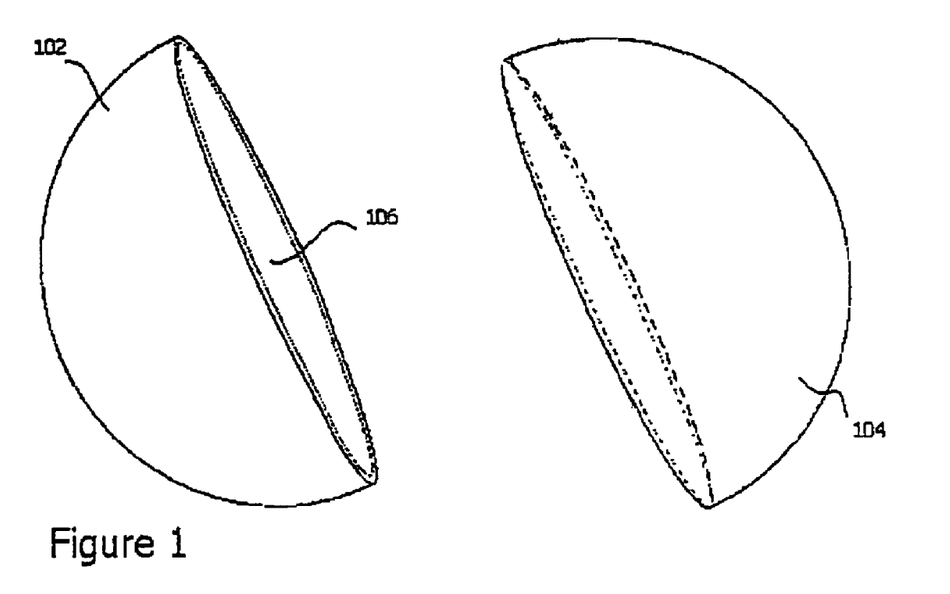
FIG. 1 illustrates a perspective view of two molded halves prior to bonding

In the following description numerous specific details are set forth in order to provide a more thorough understanding of the present invention. It will be apparent to one skilled in the art that the present invention may be practiced without these specific details. In other instances, well-known features have not been described in order to not obscure the invention. Referring now to the drawings and to that embodiment of the invention here presented by way of illustration, FIG. 1 illustrates two hemispherical shaped optical sections 102-104 that are formed to define a spherical enclosure with an internal cavity 106 that allows a camera or similar device to be inserted into the internal cavity. The optical sections 102-104 are molded or cast of a polymer material while holding close manufacturing tolerances. The materials used may vary so long as they remain useful with respect to the requirements of the imaging equipment that will be located within the cavity 106 and obtain an image through the sections 102-104. When the spherical lens enclosure is used in low light areas, a material of high transparency is desirable. In other applications, a less transparent material may be used to provide partial obscuring of the internal camera positioning. Still in other applications, a particular material, that is somewhat transparent to certain wavelengths and somewhat opaque to other wavelengths, may be used to form the optical sections 102-104 of the spherical lens enclosure. The process to produce these parts is by vacuum forming, injection molding, blow molding, casting, or other similar manufacturing technique. The manufacturing technique employed depends upon the resulting qualities such as optical clarity, material process requirements, dimensional stability, surface finish, etc. as demanded by the specifications for the part being produced. A preferred manufacturing technique for optical clarity and dimensional stability is injection molding. The material chosen to manufacture parts is dependent upon the resulting qualities such as light loss, optical clarity, purity, dimensional stability, environmental suitability, transparency or opaqueness to specific wavelengths, etc. as demanded by the part being produced. A preferred material for certain common requirements is polycarbonate or acrylic.

The optical sections 102-104 may possess a highly reflective exterior surface, produced from the manufacturing process. This surface allows external light to reflect off the surface of parts 102-104 and cause multiple light patterns to occur at the viewpoint of an exterior onlooker. This helps to obscure the camera or imaging equipment located within the enclosure. Alternatively, the manufacturing process could leave a matte exterior surface on the optical sections. In other embodiments, instead of the depicted two hemispherical shells, the spherical lens enclosure is constructed of more than two components, or of two components that are unlike each other.

Mold tooling, when required for the manufacturing process, is typically constructed of a ferrous material that has usually been hardened by a heat treatment process. Furthermore, the actual mold surfaces that create the part geometry possess a surface finish that is directly transferred to the corresponding location on the actual part 102-106. Matte finishes on a part are accomplished by the corresponding mold surfaces having a surface finish created by methods such as, but not limited to, bead blasting, or chemical etching. Highly reflective surfaces on a part are accomplished by the corresponding mold surfaces having a surface finish created by methods such as, but not limited to, lapping and polishing with a standard machine that utilizes constantly fed slurry of abrasive grit.

In FIG. 1, the internal surface of the optical hemispherical shells 102-104 may have a coating of material applied that is semi-transparent. This coating is sprayed on, vacuum metallized, or dipped in a liquid material or other similar process. This coating allows the reflection of some wavelengths and the transmission of other wavelengths.

Figure 2:
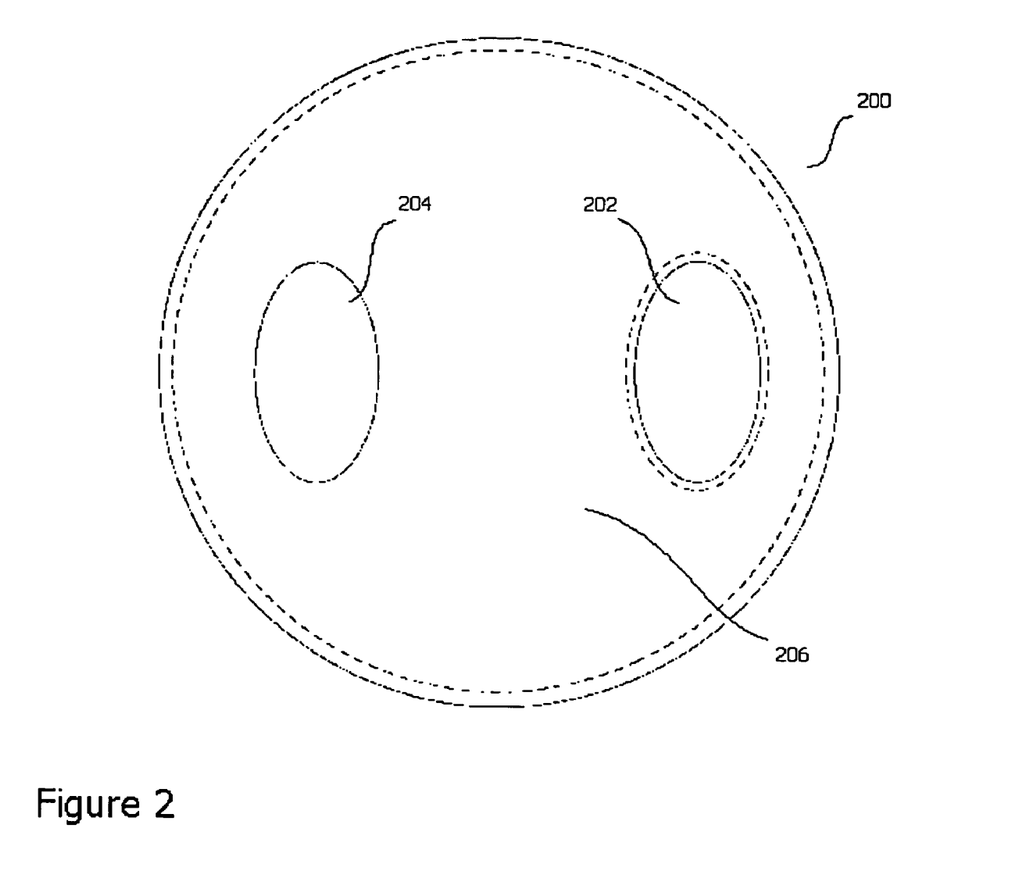
FIG. 2 illustrates cross-sectional views of various magnification configurations that are optionally molded into or affixed to the spherical lens enclosure.

An optically formed hemispherical shell 200 is shown in FIG. 2. Two lens areas 202-204 are shown of varying shapes and wall thicknesses. These areas 202-204 are molded into or have additional material adhered to the hemisphere to provide a lens that changes the light entering the internal cavity. The light may be magnified or a wider field of view may be created in these particular regions 202-204. The remaining areas 206 are of constant wall thickness offering no alteration to the presentation of light of a particular area of interest. The hemispherical shell 200 may rotate in conjunction with the internal camera lens components, or remain fixed on a particular area of interest requiring the internal camera mechanism to position itself to take advantage of the increased optical characteristics of the hemispherical shell 200.

Figure 2A:
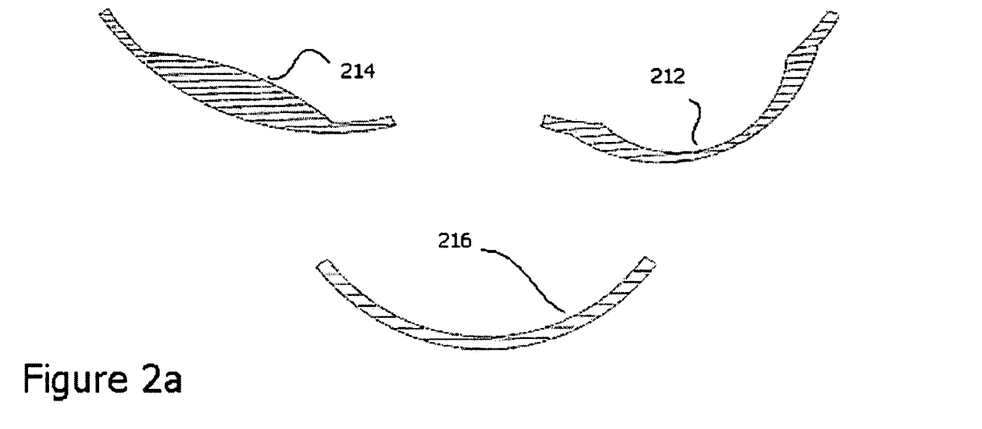
FIG. 2a illustrates a detailed view of three magnification configurations.

FIG. 2a illustrates a detailed view of the lens areas 202-204. Area 212 illustrates one configuration of the lens area 202, where the region 202 bulges and thins to form a lens. Area 214 illustrates one configuration of the lens area 204, where additional material is applied to the interior surface to form a lens. Area 216 illustrates one configuration of the remaining area 206 where no thinning and no additional material is present so that light entering this area is not optically altered with respect to its surrounding enclosure areas. A lens area 202-204 may be created on the spherical enclosure by methods that include, but are not limited to: molding the lens area into the spherical section, thinning the wall of the spherical enclosure with a machining and polishing process, adding material to the inner or outer wall of the spherical enclosure by adhering a rigid or flexible lens similar in concept to a contact lens, or cutting out a section of the wall of the spherical enclosure and affixing in its place a lens section of the desired qualities.

Figure 3:
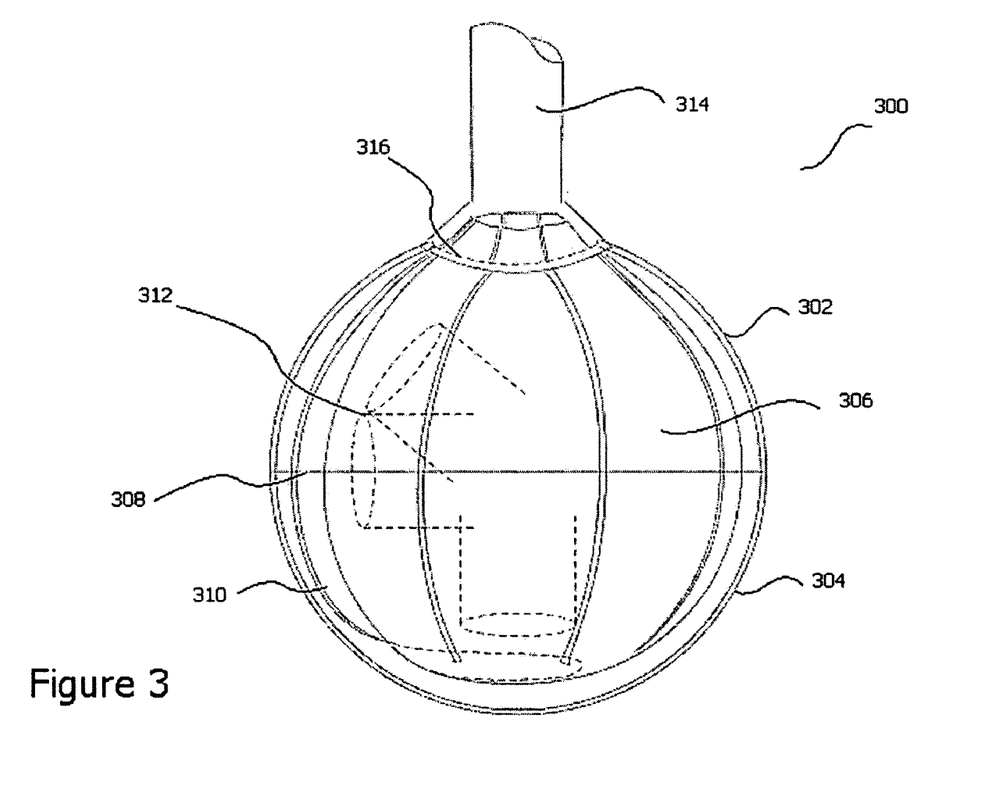
FIG. 3 illustrates a side view of the spherical lens enclosure illustrating a camera and the various camera positions related to a horizontal seam location.

FIG. 3 illustrates the lens enclosure assembly 300 for a single camera installation. In this depiction, two hemispherical shells 302-304 are bonded together by an adhesive, chemical bonding, laser welding, ultrasonic welding or other similar techniques to form a generally spherical shaped enclosure. The seam 308 is manufactured to minimize distortion to the image produced by the camera lens 312. The minimum object distance of the internal camera lens 312 is outside the external surface of the spherical lens enclosure. The hemispherical shells 302-304 can be assembled before, during, or as the very last step of the assembly process with an internal camera configuration.

In FIG. 3, the camera lens 312 position moves within a spherical shaped plastic enclosure 300. The spherical enclosure 300 allows the camera 312 to move in a vertical plane in a range of more than 90 degrees. In some embodiments, the range of vertical movement is 150 degrees or more. The placement of the camera within the enclosure 300 allows the coincidence of the optical center of the camera with the geometric center of the enclosure 300. This allows a view throughout the camera's range of pan and tilt with minimal distortion of the image. At every orientation of pan and tilt, the distortion contributed from the enclosure is radially symmetrical about the axis of vision (the optical axis of the imaging equipment).

Figure 3A:
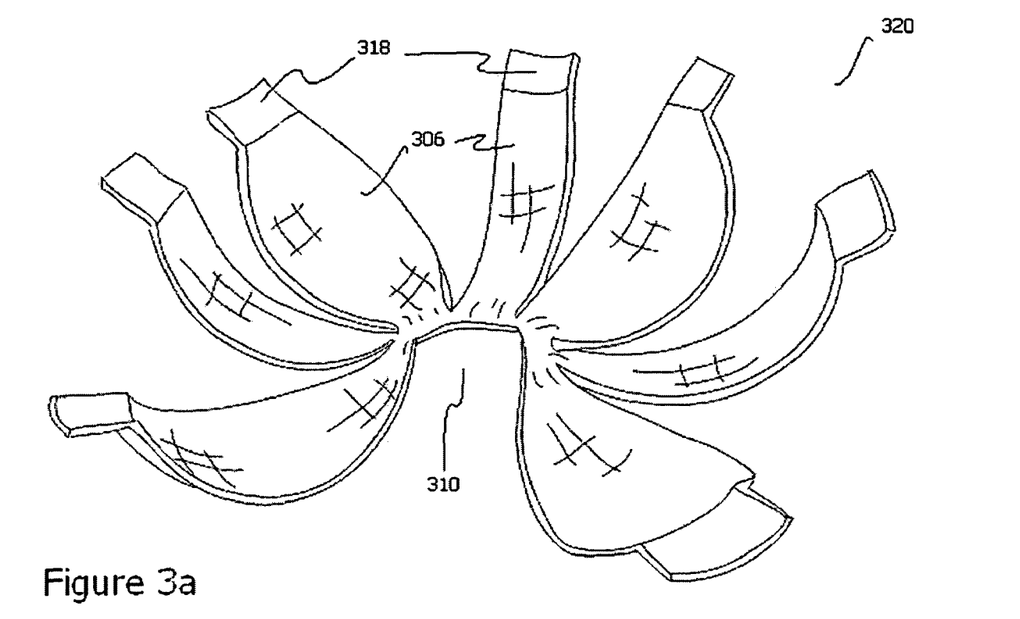
FIG. 3a illustrates a perspective view of the liner in its unfolded position.

The enclosure 300 is fitted with a collapsible shroud or liner 320. This liner 320 has a vertical slot 310 that allows the lens of the internal camera to be unobscured by the inner liner 320 during its range of tilt motion. The inner liner 320 rotates horizontally (pans) with the camera and provides an additional means of cloaking detection of the camera lens position or camera silhouette. The depicted inner liner, FIG. 3a 320 is molded of a polymer material that allows it to flex and expand after it is folded and inserted into the lens enclosure through the top opening 316. Alternatively, the liner 320 may be positioned into the assembly prior to the hemispherical shells 302-304 being joined. The liner 320 comprises foldable segments 306 that utilize attachment tabs 318 which are affixed to the mounting ring 606 of the imager mount frame 604. The mounting frame 604 also holds the camera 312, and the liner 320 is aligned with the camera so that the camera lens 312 is positioned to view through the slot 310 in the liner 320. This is illustrated below in FIGS. 6 and 7.

FIG. 3a shows the liner unfolded. The liner is formed from segments 306 that terminate in mounting tabs 318. The camera slot 310 may be cut, in width, to fit the lens diameter of the camera. After the liner 320 is installed within the spherical lens enclosure, the tabs 318 attach to the mounting ring 606, integral with the imager mounting frame 604. The liner 320 may have a textured outer surface to diffuse light entering the spherical lens enclosure, further obscuring the position of the lens slot 312. Additionally, the liner 320 may have a textured inner surface to diffuse ambient reflections. In some embodiments, the liner has a length longer than the length of the vertical axis of the enclosure, so that when inserted, the liner bows outwardly towards the inner surface of the enclosure. The end of the liner opposite the mounting tabs may have a rotational nub that fits into a receiving recessed point in the enclosure interior surface allowing the liner to rotate freely as the camera pans.

Figure 4:
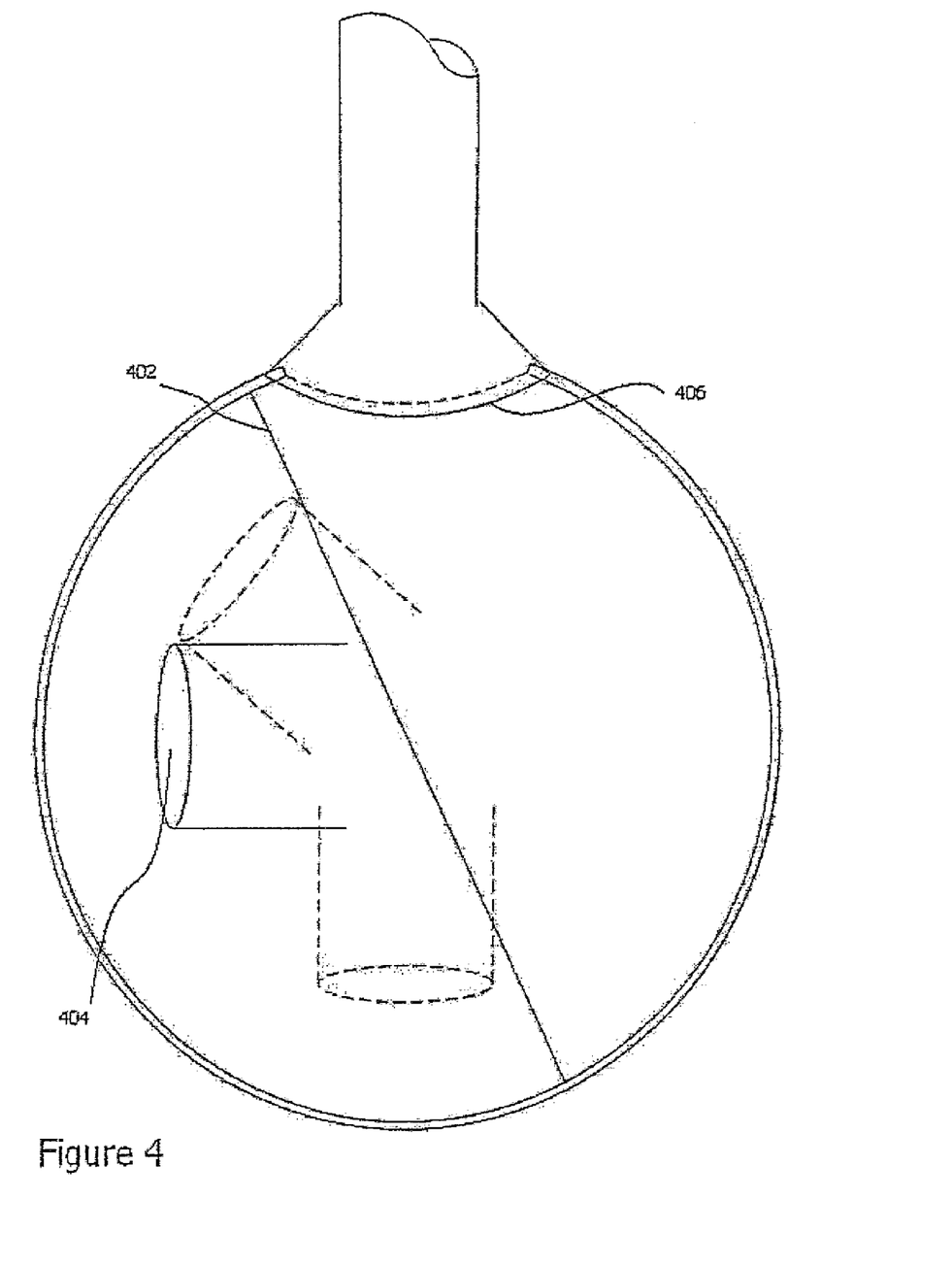
FIG. 4 illustrates a side view of the spherical lens enclosure where the seam location is in a position that minimizes interference and provides an unobstructed camera view of frequently specified targets.

FIG. 4 illustrates the seam 402 being placed in a location between the horizontal and vertical planes of the sphere as it relates to the mounting flange of the support tube 406. The seam 402 can be positioned so that it does not come into view with a single camera installation 404 if it rotates with the camera. If the lens enclosure is stationary it can be positioned so that it is not in the field of view of the camera lens 404 when viewing the areas of greater interest.

Figure 5:
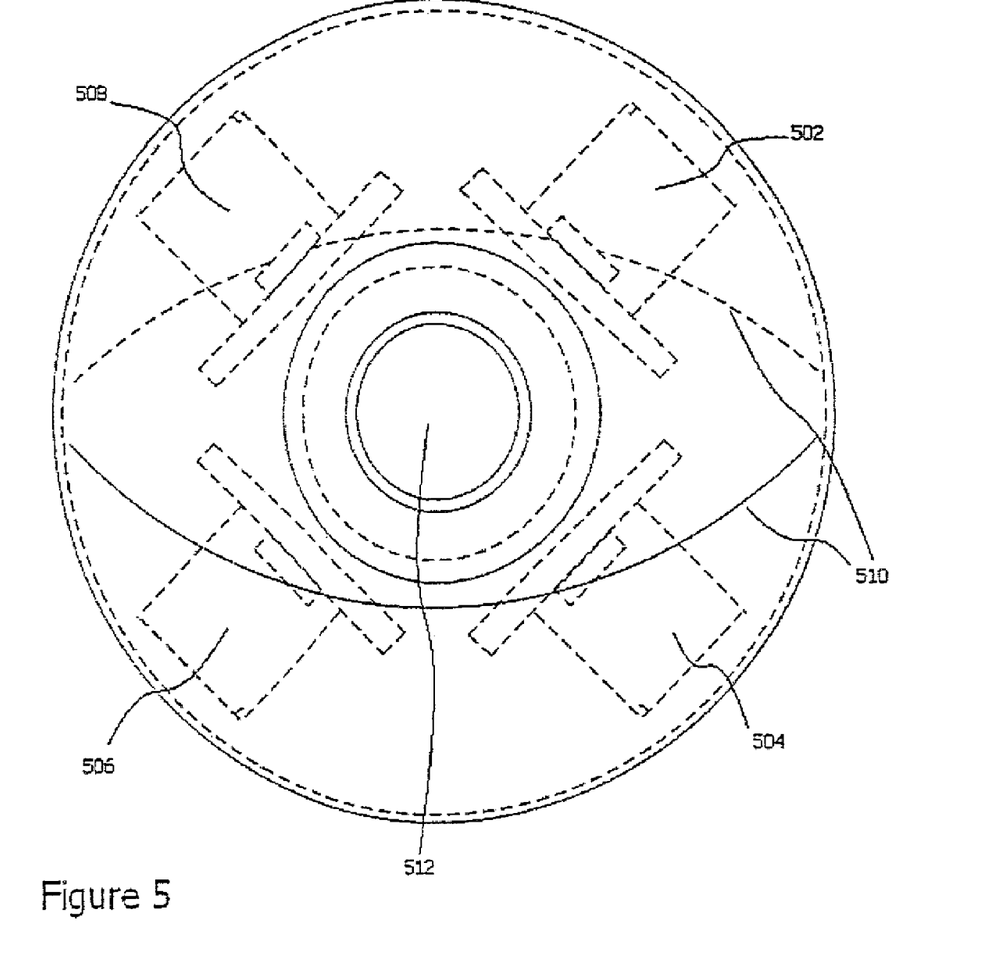
FIG. 5 illustrates a top view of the conduit opening and multiple camera placements within the spherical lens enclosure.

In situations were there are multiple stationary internal cameras mounted within the lens enclosure as illustrated in FIG. 5, the seam 510 is placed as to not be in the Field of View of the multiple cameras 502-508. The support tube 512 is a conduit for all electrical cabling which includes power, control, data, and video. While the support tube is shown as vertical, it is clear that the support tube could be mounted horizontally or another angle.

Figure 6:
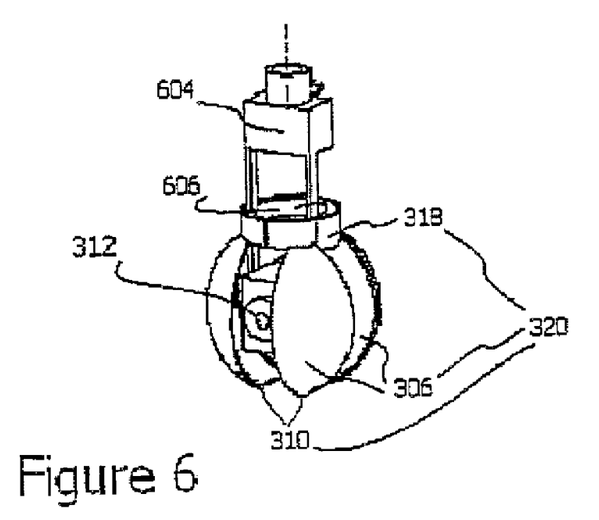
FIG. 6 illustrates a cut-away view of the camera with mounting and the enclosure liner.

FIG. 6 illustrates a view of the camera mounted within the liner 600. Descending from the mounting tube 314 (not shown) centerline is an imager mount frame 604 with integral mounting ring 606. The liner segments 306 are attached to the imager mount frame 604, at the ring 606. As the imager mount frame pans about the centerline of the mounting tube 314, the camera 312 and the liner 320 rotates with it. The camera 312 is mounted so that the optical centerline of the camera is coincident with the geometric center of the spherical optical lens enclosure 300.

Figure 7:
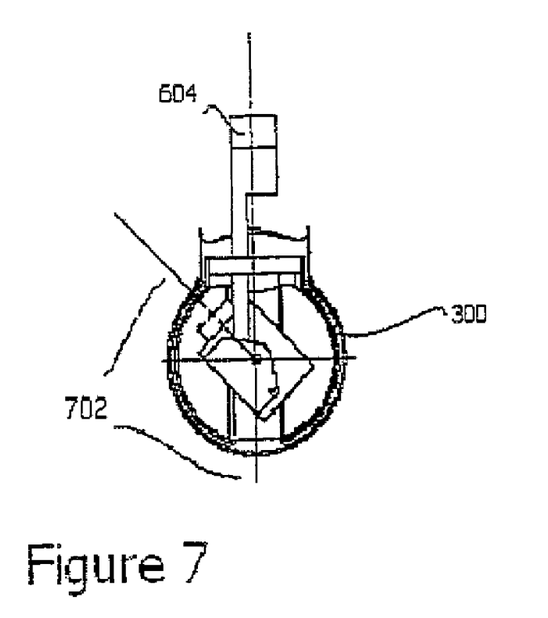
FIG. 7 illustrates a cross-sectional view of the camera in a tilt angle of greater than 90 degrees.

FIG. 7 illustrates the camera 312 within the enclosure 300 and mounted on the imager mount frame 604. The vertical tilt angle 702 of more than 90 degrees, and in some embodiments, a tilt angle of more than 150 degrees, is achieved.

The generally spherical camera enclosure of the present invention provides a strong secure mounting of one or more security cameras. The enclosure may have an interior coating to obscure its contents. One or more areas of the enclosure may be shaped to provide a lens to view specific areas within the field of vision with increased or decreased magnification. The generally spherical shape of the enclosure allows the camera within to have a vertical tilt range in excess of ninety degrees with attendant increased field of view. The materials of the enclosure and any special lens areas may be of dissimilar materials having dissimilar surface finishes and dissimilar wavelength transmission characteristics as may be required for the surveillance application. An enclosure liner can be inserted and expanded to provide additional cloaking of the camera's position and viewing range. These features provide improvement over current art.

We claim:

1. A generally spherical enclosure for mounting a camera within, the enclosure having an external surface, an internal surface, and a rotating pan and pivoting tilt support mechanism, the pivoting tilt support mechanism adapted to retain a camera such that the camera moves to pan and tilt while the enclosure remains fixed, wherein the camera has a viewing tilt range of more than 90 degrees;

the enclosure having a collapsible internal lining, manufactured of a material that obscures the silhouette of the camera, that moves with the camera throughout its range of panning motion.

2. The enclosure of claim 1, wherein:
the camera is mounted within the enclosure such that the optical centerline of the camera is coincident with the geometric center of the spherical enclosure throughout the range of pan and tilt movement of the camera.

3. The enclosure of claim 1, wherein:
the enclosure itself having at least one area of varying thickness, the area forming a lens.

4. The enclosure of claim 1, wherein:
the wall is constructed of a plurality of parts joined at one or more seams, where the material of a first part of the plurality of parts is dissimilar from the material of a second part of the plurality of parts in one or more of the qualities of the set comprising, chemical composition, color, optical refraction, size, density, composition, manufacturing method, manufacturing material, surface finish, and wavelength transmission.

5. The enclosure of claim 1, wherein:
the collapsible internal lining has a slotted opening aligned with a lens of the camera to form a view opening for the camera.

6. The enclosure of claim 1, wherein:
the lining has an inner surface texture that minimizes reflections of ambient light.

7. The enclosure of claim 1, wherein:
the enclosure further has a mounting tube for cables to pass to the interior of the enclosure.

8. A spherical enclosure for mounting a camera having a lens, wherein:
the camera is mounted on an internal movable frame that extends out of the enclosure such that the camera has a viewing tilt range of greater than 90 degrees;
further comprising a collapsible inner liner having a viewing slot inserted through a mounting hole of the spherical enclosure and expanded into a position aligned with the camera lens.

9. The enclosure of claim 8, wherein:
the enclosure further has a reflective exterior surface, and an interior surface coated as to obscure the silhouette of the camera.

10. The enclosure of claim 8, wherein:
the enclosure further has a mounting tube for cables to pass to the interior of the enclosure.

* * * * *